United States Patent Office 3,285,876
Patented Nov. 15, 1966

3,285,876
PROCESS FOR COPOLYMERIZATION OF DIVERSE POLAR MONOMERS
James C. MacKenzie, Wellesley Hills, and Adam Orzechowski, Waltham, Mass., assignors to Cabot Corporation, Boston, Mass., a corporation of Delaware
No Drawing. Filed Nov. 5, 1962, Ser. No. 235,533
The portion of the term of the patent subsequent to Jan. 18, 1982, has been disclaimed
20 Claims. (Cl. 260—66)

This invention relates to the copolymerization of diverse polar monomers such as vinyl esters with vinyl ethers, acrylic monomers with halogen substituted mono- and di-olefinic hydrocarbons, vinyl ethers with acrylics, vinyl esters with halogen substituted mono- and di-olefinic hydrocarbons and vinyl esters with acrylic monomers.

Accordingly, it is a principal object of the present invention to provide a novel process for the copolymerization of diverse polar monomers.

Other objects of the present invention will in part be obvious and will in part appear hereinafter.

In accordance with the present invention, diverse polar monomers are copolymerized by catalysts comprising (a) the product of the reaction carried out under certain conditions between a halide-type compound of a metal of Groups IVa, Va or VIa, and hydroxyl groups on the surface of a finely divided, particulate inorganic solid and (b) an organometallic compound. The copolymerization reaction can be effected at suitable temperatures within the range of from about −80° C. to about 250° C. and pressures ranging from below atmospheric upwardly to any desired maximum pressure.

Inorganic solids suitable for the purposes of the present invention generally include any inorganic compound which is available in finely divided particulate form with hydroxyl groups on the surface thereof. For example, oxides such as alumina, zirconia, and silica, carbon blacks such as channel black and furnace black, and aluminates such as corundum are generally suitable for the purposes of the present invention. In particular, inorganic solids having an average particle diameter of less than about 0.1 micron and having at least $1 \times 10^{-4}$ equivalents per gram of hydroxyl groups chemically bound to the surface thereof, as set forth in more detail in U.S. application Serial No. 2,861, filed January 18, 1960, now abandoned, are preferred in accordance with the present invention.

Halide-type compounds of Groups IVa, Va, or VIa (hereinafter generally referred to as transition metal halides) suitable for the purposes of the present invention are the compounds conforming to the empirical formula:

$$TO_aX_b$$

wherein T is a metal of Groups IVa, Va, or VIa (where the group numbers correspond to the Mendeleev Periodic System); O is oxygen; $a$ is a number from 0 to 2; each X is any halogen; and $b$ is a number from 1 to 6.

Examples of suitable compounds conforming to said empirical formula are halides such as zirconium tetrachloride, tantalum pentabromide, vanadium tetrachloride and titanium tetraiodide, and oxyhalides such as chromium oxychloride and vanadium oxychloride.

The conditions under which reaction between the transition metal halide and the finely divided inorganic solid can be accomplished are subject to considerable variation. However, in order to obtain a catalyst component with high activity and reproduciable character and performance, it has been found to be all important that the finely divided inorganic solid be essentially dry and anhydrous (i.e. free of molecular water in any form) at the time it is brought into contact with the transition metal halide. In addition, it is recommended that the reaction of the inorganic solid and the transition metal halide be accomplished so as to allow by-products of the reaction to be eliminated from the reaction zone in order to thereby insure that said reaction goes to completion. Generally, the said reaction can be carried out by contacting said inorganic solid with said transition metal halide, preferably in a solution thereof in an inert hydrocarbon medium, and maintaining the two reactants in intimate contact for a period of time sufficient to effect the desired chemical reaction resulting in the chemical bonding of the transition metal to the inorganic solid. The length of time required to effect a given amount of such reaction and chemical bonding is largely dependent upon the temperature of the reaction mixture. Generally speaking, almost any temperature between about 0° C. and 300° C. and even higher temperatures can be used satisfactorily, but room temperature to about 105° C. is generally definitely preferred. Assuming provision is made for intimate contact of the dry inorganic solid and the transition metal halide, the *minimum* time required to accomplish the chemical reaction will vary from about 1 hour at room temperature to about 15 minutes at temperatures of 100° C. or over. Temperatures substantially higher than about 300° C., e.g. 500° C., are completely needless and therefore of little or no interest.

Elimination of by-products of the reaction from the reaction zone, i.e., from the reaction medium, can be accomplished in any convenient manner such as, by sweeping the reaction vessel with an inert gas, by carrying out the reaction at sufficiently elevated temperatures while stirring to drive by-products out of the reaction medium, or by complexing or reacting said by-products with suitable substances such as tertiary amines, tertiary arsines, tertiary phosphines, terpenes, terpinenes, tetra-substituted hydrazines, carbides such as calcium carbide, and other substances which will react or complex with said by-products and thereby eliminate them.

Organometallic compounds suitable for the purposes of the present invention are the compounds chosen from the group consisting of:

(a) Compounds conforming to the empirical formula $$MM'_vX_nR_y$$

wherein M is a metal chosen from Groups I, II and III of the periodic table; M' is a metal of Group I of the periodic table; $v$ is a number from 0 to 1; each X is any halogen; $n$ is a number from 0 to 3; each R is any monovalent hydrocarbon radical or hydrogen; and $y$ is a number from 1 to 4; and (b) Compounds conforming to the empirical formula $$R'_pH_mSiO_{\frac{4-(m+p)}{2}}$$

wherein each R' is chosen from the group consisting of monovalent hydrocarbon radicals, monovalent alkoxy radicals, monovalent aryloxy radicals, and the halogens; $p$ is a number from from 0 to 3; each H is a hydride radical; $m$ is a number from 1 to 4; Si is silicon; and O is oxygen.

Specific examples of R' groups for substitution in the above formula include methyl, 2-methyl-2-butenyl, n-dodecyl, 4-cyclo-hexylethyl, methylnaphthylethyl, 2,2,1-bicycloheptyl, tolyl xylyl, xenyl, methoxy, isobutoxy, n-octyloxy, phenoxy and 1,2-naphthoxy.

Specific examples of compounds conforming to the formula $$R'_pH_mSiO_{\frac{4-(m+p)}{2}}$$

which are suitable for the purposes of the present invention are silane—SiH$_4$;
ethylsilane—H$_3$SiC$_2$H$_5$;
diethylmonochlorosilane—HSiCl(C$_2$H$_5$)$_2$;
dichlorosilane—H$_2$SiCl$_2$;
methyldiethylsilane—HSi(C$_2$H$_5$)$_2$CH$_3$;
trimethoxysilane—HSi(OCH$_3$)$_3$;
tribenzylsilane—HSi(CH$_2$C$_6$H$_5$)$_3$;
dicyclohexylphenylsilane—HSiC$_6$H$_5$(C$_6$H$_{11}$)$_2$;
triphenoxysilane—HSi(OC$_6$H$_5$)$_3$;
cyclic alkyl hydrogen silicones such as (CH$_3$HSiO)$_6$;
and linear alkyl hydrogen silicones such as $$(CH_3)_2HSiOSiH(CH_3)_2$$

Organometallic compounds which conform to the formula $$MM'_vX_nR_y$$

and which are suitable for the practice of the invention include compounds conforming to the subgeneric formula:

$$MR_k$$

wherein M is a Group I, II, or III metal, such as sodium, beryllium, boron, aluminum and gallium; wherein $k$ equals 1, 2 or 3 depending upon the valency of M; and wherein each R may be hydrogen or any monovalent hydrocarbon radical. Examples of suitable hydrocarbon radicals include aryl or alkaryl radicals, aliphatic hydrocarbon radicals, or derivatives, such as alkyl, cycloalkenyl-alkyl, arylalkyl, alkylcycloalkyl and cycloalkylalkenyl.

Specific examples of R groups for substitution in the above formula include methyl, isobutyl, hexyl, n-dodecyl, 2-methyl-2-butenyl, 4-cyclohexylethyl, 2-phenylpropyl, methylnaphthylethyl, 2,2,1-bicycloheptyl, dimethylcyclohexyl, 5-cyclopentadienyl, phenylcyclohexyl tolyl, xylyl, xenyl, and dimethylnaphthyl.

Specific compounds conforming to the empirical formula, $$MM'_vX_nR_y$$

and which are therefore suitable for the purposes of the present invention are organo compounds such as butyllithium, di-p-tolylmercury, tri-n-amylboron, triisobutylaluminum, diisobutylaluminum bromide, phenylmercuric iodide, hexylcupric chloride, octylmagnesium hydride, triethyllithium aluminum bromide and sodium diphenyllithium. Definitely preferred, however, are the aluminum alkyls such as aluminum triisobutyl.

Further specific examples of suitable organometallic compounds conforming to the formula $$MM'_vX_nR_y$$

can be found in our copending U.S. application, Serial No. 2,861, filed Jannuary 18, 1960, now abandoned.

It is pointed out that catalysts formed with a silane require activation by heating to a temperature above about 100° C. and preferably above about 140° C. for at least about 1 hour. At higher temperatures, shorter periods of time are required. At substantially lower temperatures, the catalyst is either not formed at all or is of inferior quality.

Although it is appreciated that when R or R′ in the above empirical formulae do not comprise at least one hydrocarbon radical, the resulting compounds cannot normally be termed organometallic compounds, compounds lacking at least one hydrocarbon radical comprise such a relatively small number of compounds included by said general formulae that for the purposes of the present invention, it is intended that these compounds be included within the generic term, organometallic compound. Accordingly, in the specification and in the claims, it is intended, and therefore it should be understood, that the term, organometallic compound, refers to all the compounds included within the scope of the above defined empirical formulae. In addition, it is pointed out that while, strictly speaking, silicon is not a metal, it is clearly intended, and therefore it should be understood, that for the purposes of the present specification and claims, silicon is a metal and the term "organometallic" includes within its scope all those compounds within the scope of the formula $$R'_pH_mSiO_{\frac{4-(m+p)}{2}}$$

Polar monomers suitable for the purposes of the present invention are:

(a) Vinyl esters conforming to the formula:

$$H_2C=C-O-\overset{O}{\underset{Q}{\overset{\|}{C}}}-R''$$

wherein Q is chosen from a group consisting of hydrogen, any hydrocarbon radical having 1 to 3 carbon atoms and any substituted hydrocarbon group having 1 to 3 carbon atoms; and R″ is chosen from the group consisting of hydrocarbon radicals and halogen-substituted hydrocarbon radicals having 1–18 carbon atoms. Specific examples of vinyl esters within the scope of the present disclosure are vinyl chloroacetate, vinyl propionate, vinyl butyrate, vinyl benzoate, vinyl acetate, vinyl formate, vinyl diethyl acetate, vinyl crotonate, vinyl dichlorobenzoate and 1-methyl vinyl butyrate;

(b) Halogen-substituted α-mono- and di-olefinic hydrocarbons conforming to the formula:

$$CH_cX_d=C'H_eX_f$$

wherein each H is a hydrogen; $c$ is a number from 0 to 2; each X is any halogen; $d$ is a number from 1 to 2; $c+d=2$; C′ is any aliphatic, alicyclic or aromatic carbon chain which contains 1–18 carbon atoms; $e$ is a number from 0 to 36; $f$ is a number from 1 to 6; and wherein $f+d$ equals at least one. Specific halogen-substituted α-mono- and diolefinic hydrocarbons included are 1,2-difluoroethylene; 1,3 - dichloropropene; 3,3 - dibromo-1-fluoropropene; 1,6-dichloro - 1,5 - hexadiene; 2-fluoro-1,3-butadiene; vinyl chloride; tetrafluoroethylene; 2-methyl-1-chloropropene; 1,6-difluoro-8-iodo-1-pentadecene; α-chlorovinyl cyclopropane and 1-vinyl-4-chloronaphthalene;

(c) Acrylic monomers conforming to the formula:

$$H_2C=\underset{D}{\overset{}{C}}-G$$

wherein D is chosen from the group consisting of hydrogen, any halogen, methyl, ethyl and propyl radicals; and G is a functional group chosen from the group consisting of carbalkoxy (—COOR) wherein the hydrocarbon radical has a length of one to eighteen carbon atoms; carbamoyl (—CONH$_2$); N-substituted carbamoyl (—CONHR, —CONR$_2$)

wherein the hydrocarbon radicals have a length of one to eighteen carbon atoms; formyl (—CHO); cyano (—C≡N); and acyl (—COR) wherein the hydrocarbon radical has a length of one to eighteen carbon atoms. Specific examples of suitable acrylic monomers are N-methyl acrylamide, isopropyl acrylate, methyl methacrylate, acrylonitrile, acrolein, ethylacrylate, methyl vinyl ketone and α-chlorovinyl methyl ketone; and (d) Vinyl ethers conforming to the formula:

$$H_2C=\underset{E}{\overset{}{C}}-O-F$$

wherein E is chosen from a group consisting of hydrogen, any halogen, and any hydrocarbon radical having a length of one to eighteen carbon atoms, and F is chosen from the group consisting of any hydrocarbon radical and halogen-substituted hydrocarbon radical having a length of one to eighteen carbon atoms. Specific vinyl ethers within the scope of the present disclosure are vinyl methyl ether, vinyl isobutyl ether, vinyl n-butyl ether, vinyl 2-chloroethyl ether, divinyl ether and vinyl ethyl ether.

In addition, other polar monomers such as vinyl furan, vinyl pyridine, vinylidene cyanide, and 2-vinyl diphenyline oxide, are included within the scope of the present invention.

Furthermore, it is acknowledged that while not every compound within the scope of the preceding formulae is polar, non-polar compounds comprise such a relatively small part of the total, that for the sake of simplicity and brevity all the compounds within the scope of the above formulae are referred to as polar compounds. Therefore, it is intended and it should be understood that for the purposes of the present specification and claims, all compounds included within the scope of the above formulae are also included within the scope of the generic term "polar monomers."

Using the catalysts of this invention, copolymerization of diverse polar monomers can be accomplished in the absence of liquids (other than the monomers themselves) solvents or diluents, for example, in the gas phase, but it is usually more convenient to effect polymerization in the presence of a substantially inert liquid reaction medium. Accordingly, an inert liquid reaction medium is preferably supplied to the reaction zone. Several classes of hydrocarbons or their mixtures which are liquid and substantially inert under the polymerization conditions of the present process constitute suitable liquid reaction media. Thus, various classes of saturated hydrocarbons such as pure alkanes or cycloalkanes or commercially available mixtures, freed of harmful impurities, are suitable for the purposes of the present invention. For example, straight run naphthas or kerosenes containing alkanes and cycloalkanes and liquid or liquefied alkanese such as n-hexane, 2,3-dimethylbutane, n-dodecane, dimethylcyclopentane, methyldecalins, and the like are suitable. Also members of the aromatic hydrocarbon series such as isopropyl benzene, ethyltoluene, hemimellitene, pseudocumene, isodurene, isoamylbenzene, and particularly the mononuclear aromatic hydrocarbons such as xylenes, mesitylene and xylene-p-cumene mixtures, and the like are completely suitable.

The proportion of surface reacted particulate inorganic solid to organometallic compound utilized in preparing the catalyst is not usually a critical feature of the process. We have found from experience that a molar ratio of from 0.1 to 5 millimoles of the organometallic compound per atom of transition metal chemically combined with the surface of the finely divided solid is to be preferred.

The quantity of catalyst, i.e., comprising both the surface reacted finely divided solid and the organmetallic compound, to be utilized in the polymerization reaction may vary, but in general, the total quantity of catalyst that need be employed based on the weight of the charging stock is very small particularly when a very fine particle size oxide is utilized as the inorganic solid.

The contact time or space velocity employed in the polymerization process will be selected with reference to the other process variable such as the particular catalysts utilized, the specific type of product desired, and the extent of monomer conversion desired in any given run or pass over the catalyst. In general, this variable is readily adjustable to obtain the desired results.

There follow a number of illustrative, non-limiting examples:

Example 1

To a 2,000 millimeter, three neck, glass reaction vessel there is added 15 grams of "Hi-Sil-X-303," a precipitated silica produced by Columbia Southern Chemical Corp. and which has an average particle diameter of about 23 milimicrons and a hydroxyl group content on the surface thereof of about 1.3 milliequivalents per gram. Said reaction vessel is then placed in a vacuum drying oven heated to a temperature of about 120° C., for about 24 hours. Subsequently, the vessel is sealed without exposing said silica to the atmosphere and there is charged to said vessel 12 millimoles of titanium tetrachloride and 1,000 milliliters of anhydrous isooctane. The vessel is then continuously agitated and heated to, and maintained at, about the refluxing temperature of isooctane (i.e., 99.2° C.) for a period of 8 hours while the contents thereof are continuously swept with a stream of dry nitrogen. Subsequently, the extent of the reaction between the titanium tetrachloride and the silica is determined by measuring the quantity of HCl removed from the vessel by the nitrogen stream, and by testing the liquid contents of the vessel for the absence therein of titanium tetrachloride, and the said silica is found to have 12 miliatoms of titanium chemically bound to the surface thereof. 2 grams of this silica containing about 1.6 milliatoms of titanium chemically bound to the surface thereof, and suspended in about 133 milliliters of anhydrous isooctane is then transferred without exposure to the atmosphere from this reaction vessel to a one liter autoclave which has been previously flushed with dry nitrogen. 100 milliliters of anhydrous isooctane, 150 millimoles of vinyl chloride and 450 millimoles of vinyl benzoate are then charged to this second vessel. Next, 2 millimoles of triethylaluminum is added, and the contents of said reaction vessel are continuously and vigorously stirred at ambient temperatures for about 24 hours. The reaction products are analyzed and it is found that about 25.2 grams of vinyl chloride-vinyl benzoate copolymer have been produced.

Example 2

To a 2,000 milliliter, three neck, glass reaction vessel equipped with a stirrer, a condenser and nitrogen inlet and outlet tubes, there is added 15 grams of "Supercarbovar," a channel carbon black produced by Cabot Corp., which has an averge particle diameter of about 14 millimicrons and a hydroxyl group content on the surface thereof of about 1.6 milliequivalents per gram. To said reaction vessel there is added 1,800 milliliters of benzene and the resulting slurry is dried by being heated to, and maintained at, the boiling point of benzene, i.e., about 80° C., for about 24 hours while a water/benzene azeotrope is removed from the reaction vessel by periodic distillation until about 600 milliliters of distillate has been removed. The vessel is then cooled and charged with 15 millimoles of zirconium tetrachloride. The resulting slurry is then refluxed for 20 hours with continuous stirring while the HCl produced is removed by a stream of dry nitrogen. Subsequently, the extent of the reaction between the zirconium tetrochloride and the hydroxyl groups on the carbon black is determined by measuring the quantity of HCl that was produced and by testing the liquid contents of the vessel for the absence therein of zirconium tetrachloride, and the said carbon black is found to have 15 milliatoms of zirconium chemically bound to the surface thereof. A sample of 80 milliliters of this slurry containing about 1 milliatom of zirconium bound to the surface of about 1 gram of carbon black, is then transferred from this reaction vessel to a one liter stirred autoclave which has been previously flushed with dry nitrogen. Next, 3 milimoles of triphenoxysilane is added to the autoclave. The autoclave is then heated to, and maintained at, about 150° C. for about 2 hours while being continuously agitated. After being allowed to cool to about 80° C. at which temperature the autoclave is thereafter maintained, 100 millimoles of vinyl proprionate are introduced into the vessel followed by pressurization to 800 p.s.i. with vinyl methyl ether into the autoclave. The reaction product is analyzed and it is found that a vinyl proprionate-vinyl methyl ether copolymer has been produced.

Example 3

To a 2,000 millimeter, three neck, glass reaction vessel there is added 20 grams of "Cab-O-Sil," a pyrogenic silica produced by Cabot Corportion, which has an average particle diameter of 10 millimicrons and a hydroxyl group content on the surface thereof of about 1.5 milliequivalents per gram. Said reaction vessel is then placed in a vacuum drying oven heated to a temperature of about 110° C. for about twelve huors. Subsequently, the vessel is sealed without exposing the silica to the atmosphere and there are charged to said vessel 20 millimoles of vanadium pentabromide and 1,000 milliliters of 2,3-dimethylbutane. The vessel is then continuously stirred and maintained at refluxing temperature for a period of 48 hours while the contents thereof are swept by a stream of dry nitrogen. Susbsequently, the extent of the reaction between the vanadium pentabromide and the silica is determined by measuring the quantity of HBr removed from the vessel by the nitrogen stream, and by testing the liquid contents of the vessel for the absence therein of vanadium pentabromide. The said silica is found to have 20 milliatoms of vanadium on the surface thereof. 100 milliliters of this slurry containing about 2 milliatoms of vanadium bound to the surface of about 1.0 gram of silica, is then transferred from this reaction vessel to an 8 ounce bottle which has been previously flushed with dry nitrogen. Next, 2 millimoles of triethyel lithium aluminum bromide is added to the bottle followed by 100 millimoles each of methyl methacrylate and 2-chloro-1,3-butadiene monomers. The bottle is then continuously agitated at ambient temperatures for 24 hours. The reaction products are analyzed and it is found that a methyl methacrylate-chloro-1,3-butadiene copolymer has been produced.

*Example 4*

To a 1000 milliliter, three neck, glass reaction vessel there is added 10 grams of "Cab-O-Sil" silica. Such vessel is then placed in a vacuum drying oven heated to a temperature of about 110° C. for about twelve hours. Subsequently, the vessel is sealed without exposing the silica to the atmosphere and there is charged to said vessel 10 millimoles of chromium oxydichloride and 500 milliliters of anhydrous isooctane. The vessel is then continuously stirred and maintained at about refluxing temperature (about 99.2° C.) for a period of 8 hours while the contents thereof are swept by a stream of dry nitrogen. Subsequently, the extent of the reaction between the chromium oxydichloride and the silica is determined by measuring the quantity of HCl removed from the vessel by the nitrogen stream, and by testing the liquid contents of the vessel for the absence therein of chromium oxydichloride and the said silica is found to have 10 milliatoms of chromium chemically combined to the surface thereof. 50 milliliters of this slurry containing about 1 milliatoms of chromium bound to the surface of about 1 gram of silica, is then transferred from this recation vessel to a 500 milliliter stainless steel reaction bomb which has previously been flushed with dry nitrogen. Next, 100 millimoles each of acrylonitrile and 2,3-dichloropropylene monomer are introduced into the bomb, followed by 2 millimoles of phenyl mercuric bromide. The bomb is then sealed, raised to, and maintained at, 80° C., and agitated continuously for 2 hours. The reaction products are then analyzed and it is found that an acrylonitrile - 2,3 - dichloropropylene copolymer has been produced.

The copolymers produced by the process of this invention can be subjected to such aftertreatment as may be desired to fit them for particular uses or to impart desired properties. Thus, the copolymers can be extruded, mechanically milled, filmed or cast, or converted to sponges or latices. Also, antioxidants, stabilizers, fillers such as carbon black and silicas, extenders, plasticizers, pigments, insecticides, fungicides, etc., can be incorporated into the copolymers.

Obviously many changes may be made in the above-described examples and procedure without departing from the scope of the invention. For example, although only transition metal chlorides and bromides are mentioned in the above examples, transition metal iodides and fluorides are also suitable for the purposes of the present invention. For example, titanium tetrafluoride is entirely suitable.

Also pyrogenically coformed, or coprecipitated metal oxides, or metal oxides coformed with, or mixed with, other compounds are suitable finely divided inorganic solids for the purposes of the present invention.

Accordingly, it is intended that the above disclosure be regarded as illustrative and in no way limiting the scope of the invention.

What we claim is:

1. A process for copolymerizing polar monomers chosen from at least two of the following groups:

(a) vinyl ester monomers conforming to the formula:

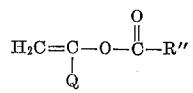

wherein Q is chosen from the group consisting of hydrogen, any hydrocarbon radical having 1 to 3 carbon atoms, and any substituted hydrocarbon group having 1 to 3 carbon atoms; and R" is chosen from the group consisting of hydrocarbon radicals and halogen-substituted hydrocarbon radicals having 1–18 carbon atoms;

(b) halogen substituted α-mono- and di-olefinic hydrocarbons conforming to the formula:

$$CH_cX_d=C'H_eX_f$$

wherein each H is a hydrogen; $c$ is a number from 0 to 2; each X is any halogen; $d$ is a number from 0 to 2; $c+d=2$; $C'$ is any aliphatic, alicyclic or aromatic carbon chain which contains 1–18 carbon atoms; $e$ is a number from 0 to 36; $f$ is a number from 0 to 6, and wherein $f+d$ equals at least one;

(c) acrylic monomers conforming to the formula:

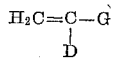

wherein D is chosen from the group consisting of hydrogen, any halogen, methyl, ethyl and propyl radicals; and G is a functional group chosen from the group consisting of carbolkoxy (—COOR) wherein the hydrocarbon radical has a length of one to eighteen carbon atoms; carbamoyl (—CONH$_2$); N-substituted carbamoyl (—CONHR, —CONR$_2$) wherein the hydrocarbon radicals have a length of one to eighteen carbon atoms; formyl (—CHO); cyano (—C≡N); and acyl (—COR) wherein the hydrocarbon radical has a length of one to eighteen carbon atoms; and (d) vinyl ether monomers conforming to the formula:

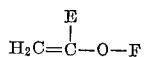

wherein E is chosen from a group consisting of hydrogen, any halogen, and any hydrocarbon radical having a length of one to eighteen carbon atoms; and F is chosen from the group consisting of any hydrocarbon radical and halogen-substituted hydrocarbon radical having a length of one to eighteen carbon atoms; with a catalyst comprising:

(a') a finely-divided inorganic solid having an average particle diameter of less than about 0.1 micron and carrying in chemical combination on the surface thereof at least about $1 \times 10^{-4}$ equivalents per gram of structures conforming to the formula $$TO_aX_b$$

where T is a metal chosen from the group consisting of the metals of Groups IVa, Va and VIa (Mendeleev Periodic System); O is oxygen; $a$ is a number from 0 to 2; each X is any halogen; $b$ is a number from 1 to 5; and where said structures are chemically linked directly from T to at least one oxygen atom in the surface of said solid; and (b') an organometallic compound chosen from the group consisting of compounds conforming to the empirical formulae (1) $$MM'_vX_nR_y$$

where M is chosen from the group consisting of the metals of Groups I, II and III; M' is a metal of Group I; $v$ is a number from 0 to 1; each X is any halogen; $n$ is a number from 0 to 3; each R is chosen from the group consisting of any monovalent hydrocarbon radical and hydrogen; and $y$ is a number from 1 to 4; and (2) $$R'_pH_mSiO_{\frac{4-(m+p)}{2}}$$

wherein each R' is chosen from the group consisting of hydrocarbon radicals, alkoxy radicals, aryloxy radicals and the halogens; $p$ is a number from 0 to 3; each H is a hydride radical; $m$ is a number from 1 to 4; Si is silicon; and O is oxygen.

2. The process of claim 1 wherein each X in the formula
$$TO_aX_b$$
is chlorine.

3. The process of claim 1 wherein the polar monomers to be copolymerized conform to the formulae

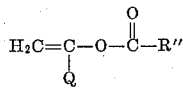

and $$CH_cX_d=C'H_eX_f$$

4. The process of claim 1 wherein the polar monomers to be copolymerized conform to the formulae

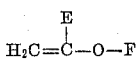

and

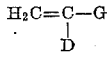

5. The process of claim 1 wherein the polar monomers to be copolymerized conform to the formulae

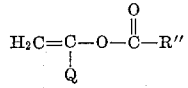

and

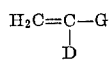

6. The process of claim 1 wherein said organometallic compound is an aluminum alkyl.

7. The process of claim 1 wherein said organometallic compound is a silane.

8. The process of claim 1 wherein said organometallic compound is a dialkylsilane.

9. A process for copolymerizing polar monomers chosen from at least two of the following groups (a) vinyl ester monomers conforming to the formula:

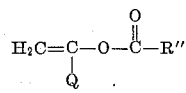

wherein Q is chosen from a group consisting of hydrogen, any hydrocarbon radical having 1 to 3 carbon atoms and any substituted hydrocarbon group having 1 to 3 carbon atoms; and R'' is chosen from the group consisting of hydrocarbon radicals and halogen-substituted hydrocarbon radicals having 1–18 carbon atoms;

(b) halogen-substituted α-mono- and di-olefinic hydrocarbons conforming to the formula:

$$CH_cX_d=C'H_eX_f$$

wherein each H is a hydrogen; $c$ is a number from 0 to 2; each X is any halogen; $d$ is a number from 0 to 2; $c+d=2$; C' is any aliphatic, alicyclic or aromatic carbon chain which contains 1–18 carbon atoms; $e$ is a number from 0 to 36; $f$ is a number from 0 to 6; and wherein $f+d$ equals at least one;

(c) arcylic monomers conforming to the formula:

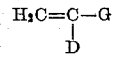

wherein D is chosen from the group consisting of hydrogen, any halogen, methyl, ethyl and propyl radicals; and G is a functional group chosen from the group consisting of carbalkoxy (—COOR) wherein the hydrocarbon radical has a length of one to eighteen carbon atoms; carbamoyl (—CONH$_2$); N-substituted carbamoyl (—CONHR, —CONR$_2$) wherein the hydrocarbon radicals have a length of one to eighteen carbon atoms; formyl (—CHO); cyano (—C≡N); and acyl (—COR) wherein the hydrocarbon radical has a length of one of eighteen carbon atoms; and (d) vinyl ether monomers conforming to the formula:

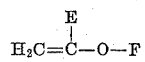

wherein E is chosen from a group consisting of hydrogen, any halogen, and any hydrocarbon radical having a length of one to eighteen carbon atoms; and F is chosen from the group consisting of any hydrocarbon radical and halogen-substituted hydrocarbon radical having a length of one to eighteen carbon atoms; with a catalyst comprising:

(1) the product of the reaction, accomplished at temperatures between about 0° C. and about 300° C. for a minimum period ranging from about 10 hours to about 15 minutes, the higher the temperature used, the shorter being the minimum time required, of (a) a compound conforming to the formula:

$$TO_aX_b$$

where T is chosen from the group consisting of metals of Groups IVa, Va or VIa (Mendeléen Periodic System); 0 is oxygen; $a$ is a number from 0 to 2; each X is any halogen; and $b$ is a number from 1 to 6; and (b) hydroxyl groups in the surface of a particulate finely divided inorganic solid having an average particle diameter of less than about 0.1 micron and having at least about $1\times10^{-4}$ equivalents per gram of hydroxyl groups chemically bound to the surface thereof; and (2) an organometallic compound chosen from the group consisting of compounds conforming to the empirical formulae $$MM'_vX_nR_y$$

wherein M is chosen from the group consisting of the metals of Groups I, II and III; M' is a metal of Group I; $v$ is a number from 0 to 1; each X is any halogen; $n$ is a number from 0 to 3; each R is chosen from the group consisting of any monovalent hydrocarbon and hydrogen; and $y$ is a number from 1 to 4; and $$R'_pH_mSiO_{\frac{4-(m+p)}{2}}$$

wherein R' is chosen from the group consisting of hydrocarbon radicals, aryloxy radicals, alkoxy radicals and the halogens; $p$ is a number from 0 to 3; each H is a hydride radical; $m$ is a number from 1 to 4; Si is silicon; and O is oxygen.

10. The process of claim 9 wherein the reaction between the compound conforming to the formula $$TO_aX_b$$

and hydroxyl groups in the surface of a particulate finely divided inorganic solid is accomplished at temperatures between about 25° C. and about 105° C. for a minimum period ranging from about 1 hour at about 25° C. to about 15 minutes at about 105° C.

11. The process of claim 1 wherein in said formula $$TO_aX_b$$

$a$ is 0.

12. The process of claim 1 wherein in said formula $$TO_aX_b$$

$a$ is 0 and each X is chlorine.

13. The process of claim 1 wherein in said formula $$TO_aX_b$$

T is a member of Group IV$a$.

14. The process of claim 1 wherein in said formula $$TO_aX_b$$

T is zirconium.

15. The process of claim 1 wherein in said formula $$TO_aX_b$$

T is titanium.

16. The process of claim 1 wherein in said formula $$TO_aX_b$$

T is titanium, $a$ is 0 and each X is chlorine.

17. The process of claim 1 wherein in said formula $$TO_aX_b$$

T is a member of Group V$a$.

18. The process of claim 1 wherein in said formula $$TO_aX_b$$

T is vanadium.

19. The process of claim 1 wherein in said formula $$TO_aX_b$$

T is a member of Group VI$a$.

20. The process of claim 1 wherein said organometallic compound conforms to the formula $$MM'_vX_nR_y$$

and wherein M is aluminum, $n$ is 0 and each R is a hydrocarbon group.

References Cited by the Examiner

UNITED STATES PATENTS

| | | | |
|---|---|---|---|
| 3,065,220 | 11/1962 | McManimie et al. | 260—91.1 |
| 3,166,541 | 1/1965 | Orzehowski et al. | 260—93.7 |
| 3,166,542 | 1/1965 | Orzehowski et al. | 260—93.7 |
| 3,166,543 | 1/1965 | Orzehowski et al. | 260—93.7 |

FOREIGN PATENTS

| | | |
|---|---|---|
| 592,111 | 7/1959 | Italy. |
| 823,024 | 11/1959 | Italy. |
| 819,291 | 9/1959 | Great Britain. |

JOSEPH L. SCHOFER, *Primary Examiner.*

J. F. McNALLY, M. B. KURTZMAN,
*Assistant Examiners.*